(12) United States Patent
Yokogawa et al.

(10) Patent No.: US 7,437,084 B2
(45) Date of Patent: Oct. 14, 2008

(54) INFRARED RADIATION RECEIVING CIRCUIT, ELECTRONIC DEVICE, AND INFRARED RADIATION RECEIVING METHOD

(75) Inventors: Naruichi Yokogawa, Kashihara (JP); Hiroaki Itoh, Kashihara (JP); Takeshi Nishino, Nara (JP); Ryosuke Kawashima, Katsuragi (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 723 days.

(21) Appl. No.: 10/968,968

(22) Filed: Oct. 21, 2004

(65) Prior Publication Data
US 2005/0087688 A1  Apr. 28, 2005

(30) Foreign Application Priority Data
Oct. 22, 2003 (JP) ............................ 2003-361750

(51) Int. Cl.
*H04B 10/06* (2006.01)
(52) U.S. Cl. .................................. 398/202; 250/338.1
(58) Field of Classification Search ......... 398/202–214; 250/338.1, 340
See application file for complete search history.

(56) References Cited

U.S. PATENT DOCUMENTS

| 5,528,443 | A | * | 6/1996 | Itoga et al. | ..................... 361/8 |
| 5,546,034 | A | * | 8/1996 | Han | ............................ 327/174 |
| 2002/0089729 | A1 | * | 7/2002 | Holcombe | .................. 359/189 |

FOREIGN PATENT DOCUMENTS

| JP | 05-175818 | 7/1993 |
| JP | 2002-232271 A | 8/2002 |

* cited by examiner

*Primary Examiner*—Kenneth Vanderpuye
*Assistant Examiner*—Thi Le
(74) *Attorney, Agent, or Firm*—Birch, Stewart, Kolasch & Birch, LLP (57) ABSTRACT

A receiving circuit stops a one shot timer from generating an output signal immediately after the output signal is outputted to an external entity until a predetermined stretch time elapses. With this arrangement, the receiving circuit will not generate a new output signal even if (i) noises generated by a voltage fluctuation of the output signal appear on an amplified signal immediately after the output signal is outputted (at the end of the output), and (ii) the value of the amplified signal exceeds a threshold value. Therefore, the receiving circuit can make sure that an unnecessary output signal will not be generated due to the noises.

15 Claims, 6 Drawing Sheets

UNNECESSARY PULSE

US 7,437,084 B2

INFRARED RADIATION RECEIVING CIRCUIT, ELECTRONIC DEVICE, AND INFRARED RADIATION RECEIVING METHOD

This nonprovisional application claims priority under 35 U.S.C. § 119(a) on Patent Application No. 361750/2003 filed in Japan on Oct. 22, 2003, the entire contents of which are hereby incorporated by reference.

FIELD OF THE INVENTION

The present invention relates to an infrared radiation receiving circuit that receives an input pulse of infrared radiation, converts the input pulse into an electric signal, and amplifies the input pulse through an amplifier, and thereby generates an output pulse.

BACKGROUND OF THE INVENTION

Infrared radiation communication has been taking root in the market as transmission and reception modules get smaller, higher in performance, and speedier.

Figure 7:
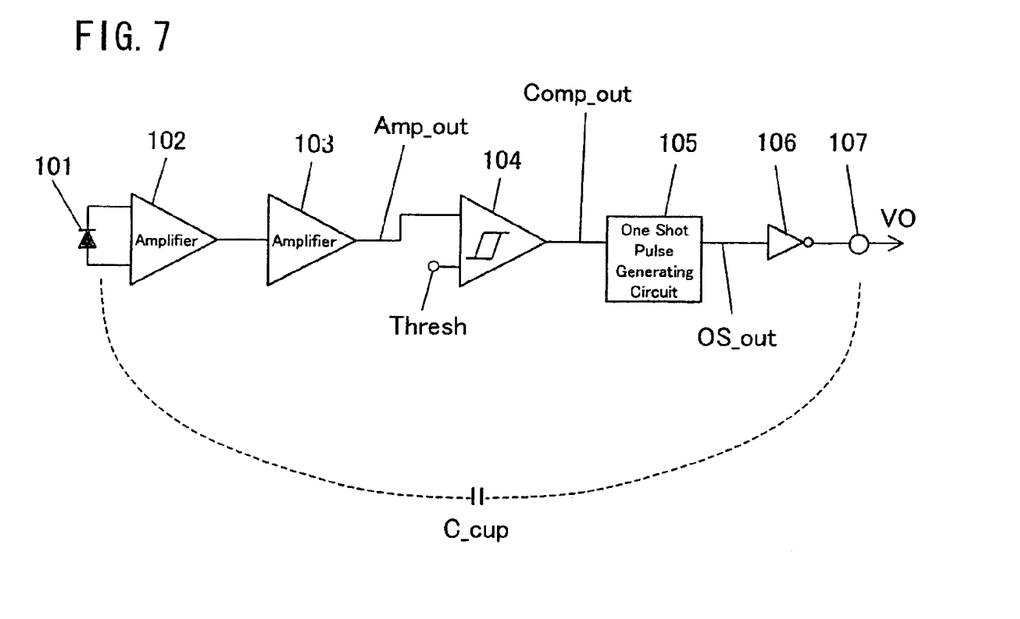
FIG. 7 is a block diagram illustrating a receiving circuit of a conventional infrared radiation communication system.

FIG. 7 is a block diagram illustrating a receiving circuit of a conventional infrared radiation communication system.

In this receiving circuit, as shown in FIG. 7, a photocurrent signal is inputted to a photodiode chip (PD) 101. Then, the photocurrent signal is amplified through amplifies (amp) 102 and 103 provided in an integrated receiving chip, thereby generating an amplified signal (Amp_out). The amplified signal is pulse-shaped through a comparator circuit (Comp) 104 by using a threshold value (Thresh). In this way, a comparator signal (Comp_out) is generated.

In accordance with the comparator signal, a one shot pulse generating circuit 105 generates a one shot pulse signal (OS_out). The one shot pulse signal is inverted through an inverter 106, and outputted as an output signal (VO) from an output terminal 107. The output signal (VO) is transmitted to a controller LSI and processed therein.

Figure 8:
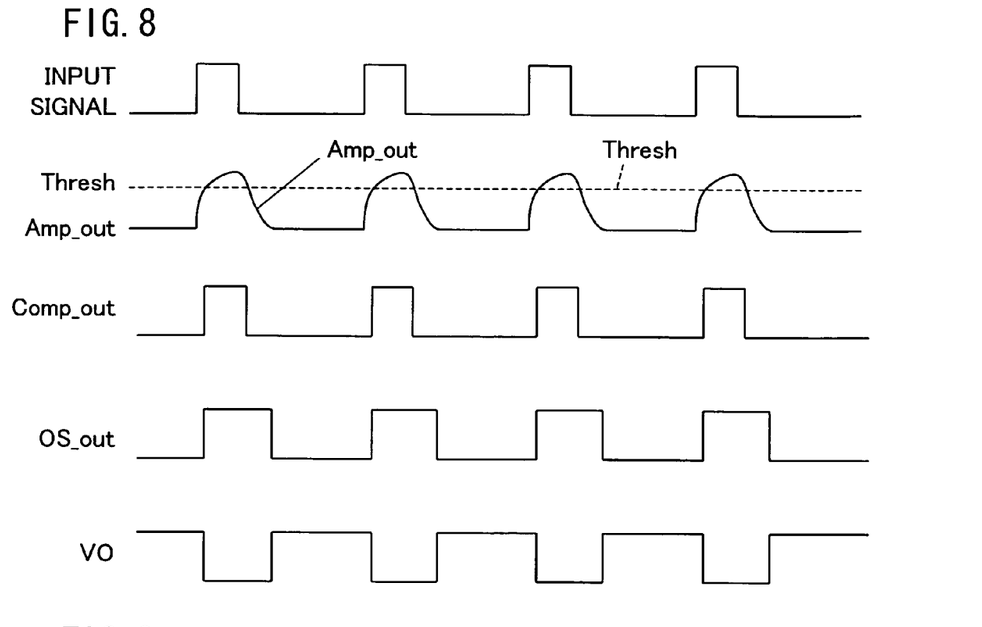
FIG. 8 is a waveform chart illustrating signals generated in the receiving circuit of FIG. 7.

FIG. 8 is a waveform chart illustrating simplified waveforms of the optical signal (input signal) outputted to the receiving circuit, the amplified signal (Amp_out), the threshold value (Thresh), the comparator signal (Comp_out), the one shot pulse signal (OS_out), and the output signal (VO).

The one shot pulse generating circuit 105 shown in FIG. 7 is a circuit for generating a one shot pulse signal of a predetermined pulse width in accordance with the comparator signal. Depending on various receiving conditions, the waveform of the output signal can be distorted. The one shot pulse generating circuit 105 prevents the distortion.

The following publication 1 is an example of this art.

Publication 1: Japanese Publication for Unexamined Patent Application, Tokukai 2002-232271 (publication date: Aug. 16, 2002).

Recently, however, the receiving circuit (receiving module device) has been getting smaller. Therefore, the distance between the receiving terminal (which receives an input signal inputted from outside) and the output terminal is physically short. As a result, the input signal and the output signal are easily coupled to each other, and the influence of coupling appears in the output signal.

If the circuit is small, it is no longer possible to ignore capacitance coupling (C_cup) that occurs between the output terminal 107 and input sections of such members as the photodiode chip 101 and the amplifier 102 of FIG. 7 through package resin or the like. Due to the capacitance coupling, noises appear on the amplified signal (Amp_out) at the timing of, for example, voltage transition (voltage fluctuation) of the output signal VO. The noises distort the waveform of the amplified signal (Amp_out).

Figure 9:
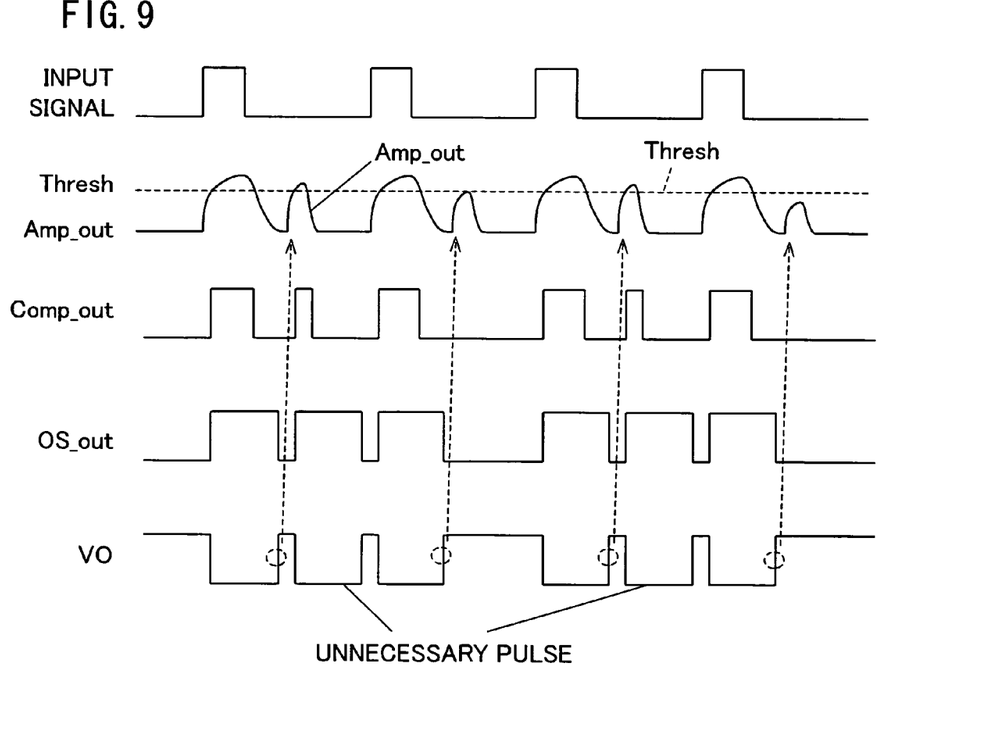
FIG. 9 is a waveform chart illustrating unnecessary pulses.

As shown in FIG. 9, the distortion of the amplified signal (Amp_out) causes unnecessary pulses in the comparator signal (Comp_out). Due to the pulses, a one shot pulse signal is generated. As a result, unnecessary pulses appear in the output signal VO and cause malfunctions.

SUMMARY OF THE INVENTION

The present invention was made in view of the foregoing conventional problem. An object of the present invention is therefore to provide a receiving circuit that can prevent the unnecessary pulses from being caused by the voltage fluctuation of the output signal.

A first infrared radiation receiving circuit of the present invention (first receiving circuit) is an infrared radiation receiving circuit that generate an output pulse by receiving an input pulse of infrared radiation, converting the input pulse into an electric signal, and amplifying the electric signal, including: a pulse generating section that generates the output pulse by turning an amplified signal amplified through an amplifier into a pulse by using a threshold value, and outputs the output pulse to an external entity; and a suspending section for suspending the pulse generating section from generating the output pulse after the output pulse is outputted until a predetermined first time elapses.

The first receiving circuit is a receiving circuit of an infrared radiation communication system, and used in electronic devices such as portable phones, personal computers, and other home electric appliances and industrial devices.

The first receiving circuit receives an infrared radiation signal (input pulse) inputted from an external transmitting device (transmitting circuit). After that, the first receiving circuit converts the infrared radiation signal into an electric signal by using a photoelectric conversion element, such as a photodiode (PD), and amplifies the electric signal through an amplifier.

As described above, in the first receiving circuit, the pulse generating section generates the output pulse by turning the amplified signal into a pulse by using the threshold value, and outputs the output pulse to an external entity.

The pulse generating section compares the value of the amplified signal (voltage value) and the threshold value, and, at the timing at which the absolute value of the amplified signal exceeds the threshold value, generates an output signal having a predetermined pulse width.

Particularly of note is that the first receiving circuit includes the suspending section that suspends the pulse generating section from generating the output pulse from immediately after the output pulse is outputted to an external entity until the predetermined first time elapses.

With this arrangement, immediately after an output pulse is outputted (at the end of an output), even if noises appear on the amplified signal due to the voltage fluctuation of the output pulse, and the value of the amplified signal exceeds the threshold value, the first receiving circuit does not generate a new output pulse.

Thus, the first receiving circuit ensures that an unnecessary output signal will not be generated due to the noises.

If an infrared radiation receiving circuit is small, there are cases where the noises generated by the voltage fluctuation of the output pulse influence the amplified signal. However, the first receiving circuit can prevent the influence of the noises from spilling over to the output pulse. Thus, the first receiving circuit can be miniaturized easily while maintaining the quality of the output pulse.

For a fuller understanding of the nature and advantages of the invention, reference should be made to the ensuing detailed description taken in conjunction with the accompanying drawings.

DESCRIPTION OF THE EMBODIMENTS

The following describes an embodiment of the present invention.

A receiving circuit of the present embodiment (present receiving circuit) is a small receiving circuit of an infrared radiation communication system, and used in electronic devices such as portable phones, personal computers, and other home electric appliances and industrial devices.

Figure 2:
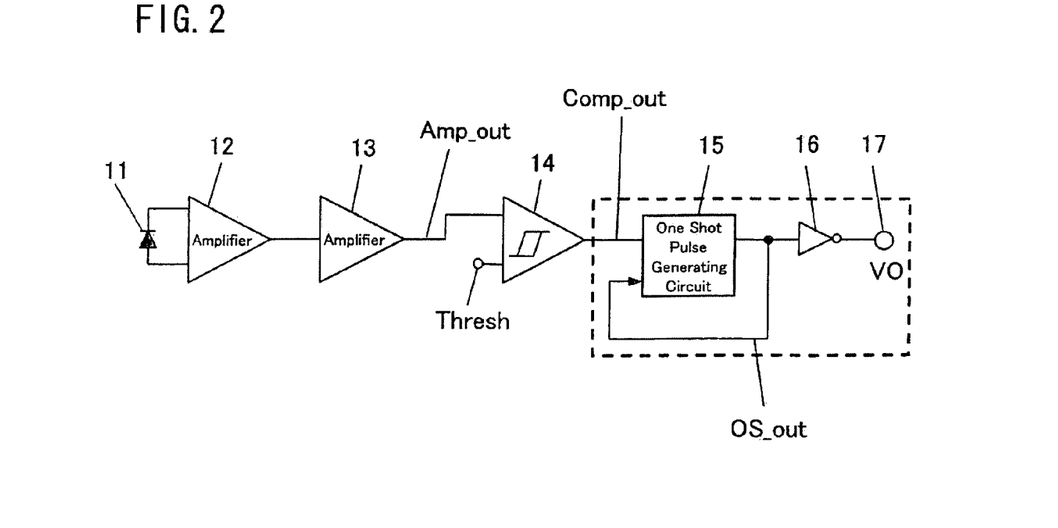
FIG. 2 is a block diagram illustrating an equivalent circuit about the arrangement of the receiving circuit.

FIG. 2 is a block diagram illustrating an equivalent circuit about an arrangement of the present receiving circuit.

As shown in FIG. 2, the present receiving circuit includes a photodiode (PD) 11, amplifiers 12 and 13, a comparator circuit 14, a one shot pulse generating circuit 15, an inverter 16, and an output terminal 17. These members of the present receiving circuit are integrated in a receiving chip.

The PD (photodiode; photoelectric conversion element) 11 receives an input signal of infrared radiation inputted from an external transmitting circuit, and converts the input signal into an electric current signal.

The amplifiers 12 and 13 amplify the electric current signal outputted from the PD 11 and thereby generate an amplified signal (Amp_out).

The comparator circuit (pulse generating section) 14 shapes the amplified signal (Amp_out) by using a predetermined threshold value (Thresh) into a comparator signal (Comp_out) having a pulse-shaped waveform.

The one shot pulse generating circuit (pulse generating section) 15 generates a one shot pulse signal (OS_out) by using a rise of the comparator signal as a trigger. The one shot pulse signal (OS_out) has a predetermined pulse width (the length of high period).

The inverter (pulse generating section) 16 inverts the one shot pulse signal, and outputs it as an output signal (VO) to the output terminal 17.

Next, an arrangement of the one shot pulse generating circuit 15, which is a feature of the present receiving circuit, is described in detail.

Figure 1:
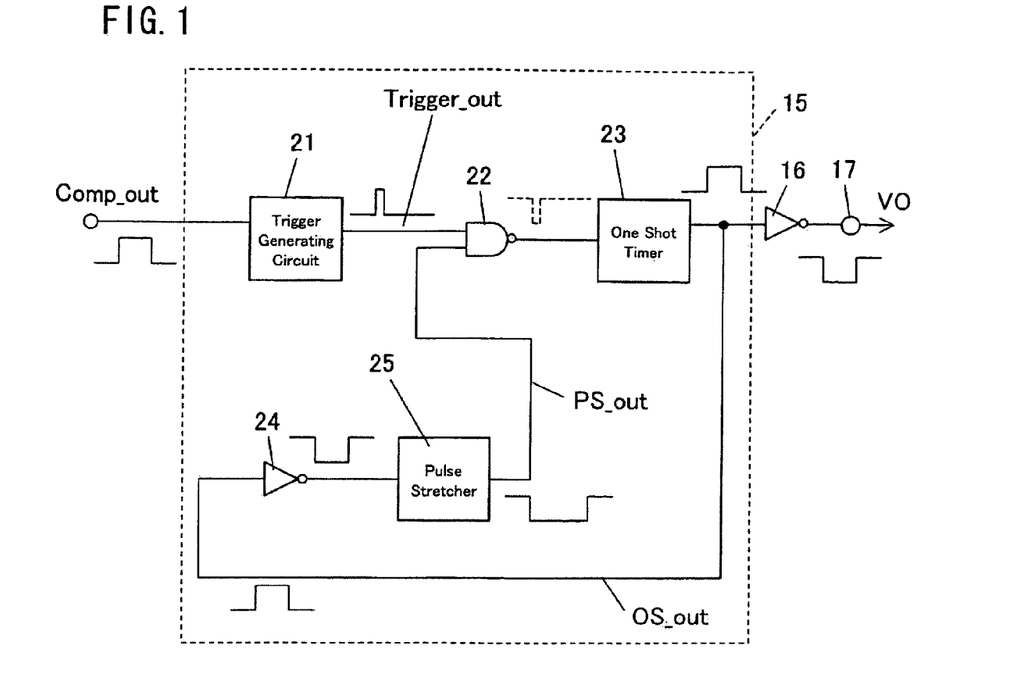
FIG. 1 is a block diagram illustrating an equivalent circuit about an arrangement of a one shot pulse generating circuit of a receiving circuit in accordance with one embodiment of the present invention.

FIG. 1 is a block diagram illustrating an equivalent circuit about the arrangement of the one shot pulse generating circuit 15.

As shown in FIG. 1, the one shot pulse generating circuit 15 includes a trigger generating circuit 21, a NAND circuit 22, a one shot timer 23, an inverter 24, and a pulse stretcher 25.

The trigger generating circuit (pulse generating section) 21 receives the comparator signal (Comp_out) generated by the comparator circuit 14, and generates a trigger signal (Trigger_out) having a peak at the timing of a rise of the comparator signal (Comp_out).

The NAND circuit (pulse generating section; logic circuit) 22 receives the trigger signal and a pulse stretch signal (described later), and outputs a pulse signal (NAND signal) that is low if both the trigger signal and the pulse stretch signal are high, and that is high if at least one of the trigger signal and the pulse stretch signal is low.

The one shot timer (pulse generating section) 23 receives the NAND signal, and generates the one shot pulse signal (OS_out) at the timing at which the NAND signal becomes low (at the timing of a fall of the NAND signal).

The one shot pulse signal is outputted to the inverter 16 and the inverter 24.

The inverter (pulse generating section; stretch section) 24 generates a one shot pulse inverted signal (a low pulse) by inverting the one shot pulse signal, and outputs the one shot pulse inverted signal to the pulse stretcher 25.

The pulse stretcher (pulse generating section; stretch section) 25 generates the pulse stretch signal (PS_out; a low pulse) at the timing of a fall of the one shot pulse inverted signal, and outputs the pulse stretch signal to the NAND circuit 22. The pulse stretch signal has a predetermined pulse width.

The pulse width of the pulse stretch signal has a value obtained by adding a predetermined stretch time to the pulse width of the one shot pulse signal. Therefore, the pulse width of the pulse stretch signal is longer than the pulse width of the one shot pulse signal.

Next, receiving operation of the present receiving circuit is described.

Figure 3:
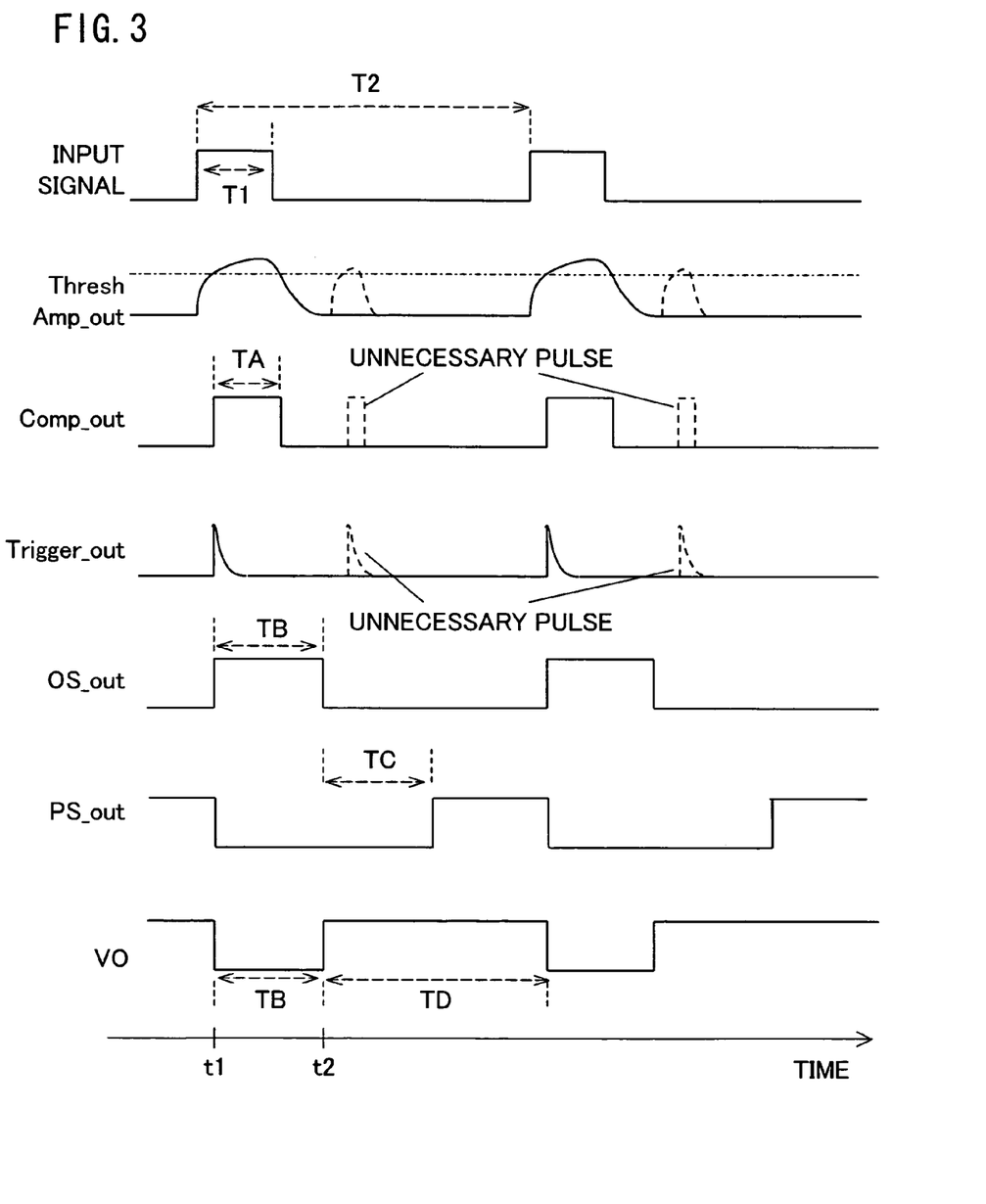
FIG. 3 is a waveform chart illustrating signals generated in the receiving circuit of FIG. 2.

FIG. 3 is a waveform chart illustrating the signals generated in the present receiving circuit.

When the PD 11 receives the input signal (pulse width: T1, period: T2), the amplified signal (Amp_out) shown in FIG. 3 is inputted through the amplifiers 12 and 13 to the comparator circuit 14.

From the comparator circuit 14, the comparator signal (Comp_out; comparator pulse) having a pulse width TA is outputted to the one shot pulse generating circuit 15 (time t1).

In the one shot pulse generating circuit 15, the trigger generating circuit 21 receives the comparator signal from the comparator circuit 14, and outputs the trigger signal (Trigger_out; trigger pulse) that is in accordance with the comparator signal to the NAND circuit 22 (time t1).

At the beginning of the receiving operation, the pulse stretch signal (PS_out; stretch pulse) outputted from the pulse stretcher 25 is high.

Therefore, in response to occurrence of the input of the trigger signal, the NAND circuit 22 outputs the pulse signal (NAND signal) having an inverted shape of the trigger signal to the one shot timer 23 (time t1).

When the NAND signal is received, the one shot timer 23 outputs the one shot pulse signal (OS_out) to the inverter 16 and to the inverter 24 (time t1). Here, the pulse width of the one shot pulse signal is TB.

Through the inverter 16 and the output terminal 17, the output signal (VO) having the pulse width TB is outputted to an external entity, such as a controller LSI (not shown) (time t1).

The inverter 24 outputs the one shot pulse inverted signal (signal generated by inverting the one shot pulse signal) to the pulse stretcher 25 (time t1).

When the one shot pulse inverted signal is received, the pulse stretcher 25 outputs the pulse stretch signal (PS_out) having a low pulse, at the timing of a fall of the one shot pulse inverted signal (i.e. at the timing of a rise of the one shot pulse signal) (time t1).

The pulse width of the pulse stretch signal has a value obtained by adding a predetermined stretch time (first time) TC to the pulse width TB of the one shot pulse signal.

There is a possibility that, at the timing of a rise of the output signal (VO) (time t2; TB after time t1), noises might appear on the amplified signal (Amp_out) due to a voltage fluctuation (sudden rise) of the output signal, thereby causing distortion (portions indicated by the dotted lines) of the signal waveform.

In this case, as shown in FIG. 3, unnecessary pulses (high) indicated by the dotted line is caused in the comparator signal (Comp_out) and in the trigger signal (Trigger_out) immediately after time t2, and outputted to the NAND circuit 22.

However, immediately after time t2, the pulse stretch signal (PS_out) having the pulse width of TB+TC is still low.

In other words, at this time, a low pulse of the pulse stretch signal (PS_out) is outputted from the pulse stretcher 25 to the NAND circuit 22.

Therefore, even if an unnecessary trigger signal is generated due to the noises, the signal outputted from the NAND circuit 22 to the one shot timer 23 is kept high (the trigger signal will not be accepted).

As a result, as shown in FIG. 3, the output of the one shot timer 23 does not have unnecessary pulses caused by the distortion of the amplified signal (Amp_out).

As described above, in the present receiving circuit, generation of the output signal by the one shot timer 23 is stopped from immediately after the output signal (VO) is outputted to an external entity until the predetermined stretch time TC elapses.

With this arrangement, immediately after an output signal is outputted (at the end of an output), even if noises appear on the amplified signal due to the voltage fluctuation of the output signal, and the value of the amplified signal exceeds the threshold value, the present receiving circuit does not generate a new output signal.

Thus, the present receiving circuit ensures that an unnecessary output signal will not be generated due to the noises.

If an infrared radiation receiving circuit is small, there are cases where the noises generated by the voltage fluctuation of the output signal influence the amplified signal. However, the present receiving circuit can prevent the influence of the noises from spilling over to the output signal.

Thus, the present receiving circuit can be miniaturized easily while maintaining the quality of the output signal.

In the example shown in FIG. 3, the pulse width (T1) of the input signal is shorter than the pulse width (TB) of the one shot pulse signal (OS_out). However, there are cases where the pulse width of the input signal is longer than the pulse width of the one shot pulse signal.

Figure 4:
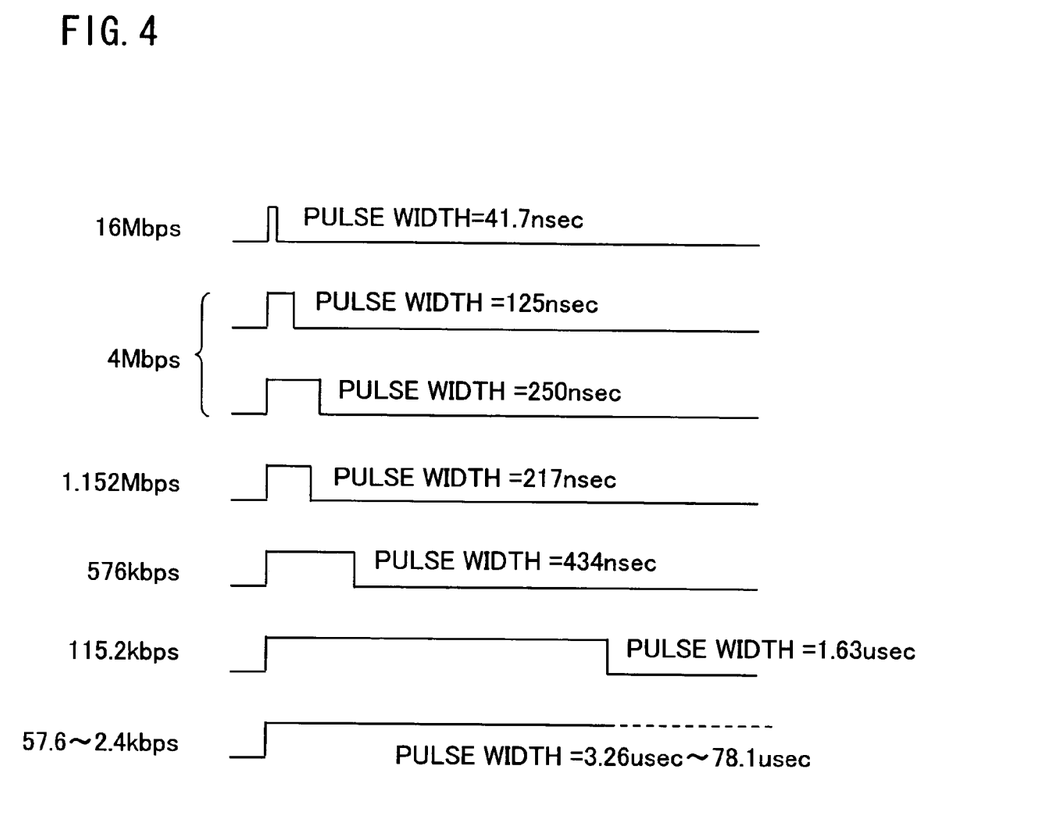
FIG. 4 is a waveform chart illustrating examples of an input signal used in IrDA, which is a generally used infrared radiation communication standard.

FIG. 4 is a waveform chart illustrating examples of an input signal used in IrDA, which is a generally used infrared radiation communication standard.

As shown in FIG. 4, if communication is performed at a communication rate of not higher than 57.6 kbps, the pulse width of the input signal is not shorter than 3.26 usec. Therefore, the pulse width of the input signal is longer than the pulse width (TB) of an ordinary one shot pulse signal.

Figure 5:
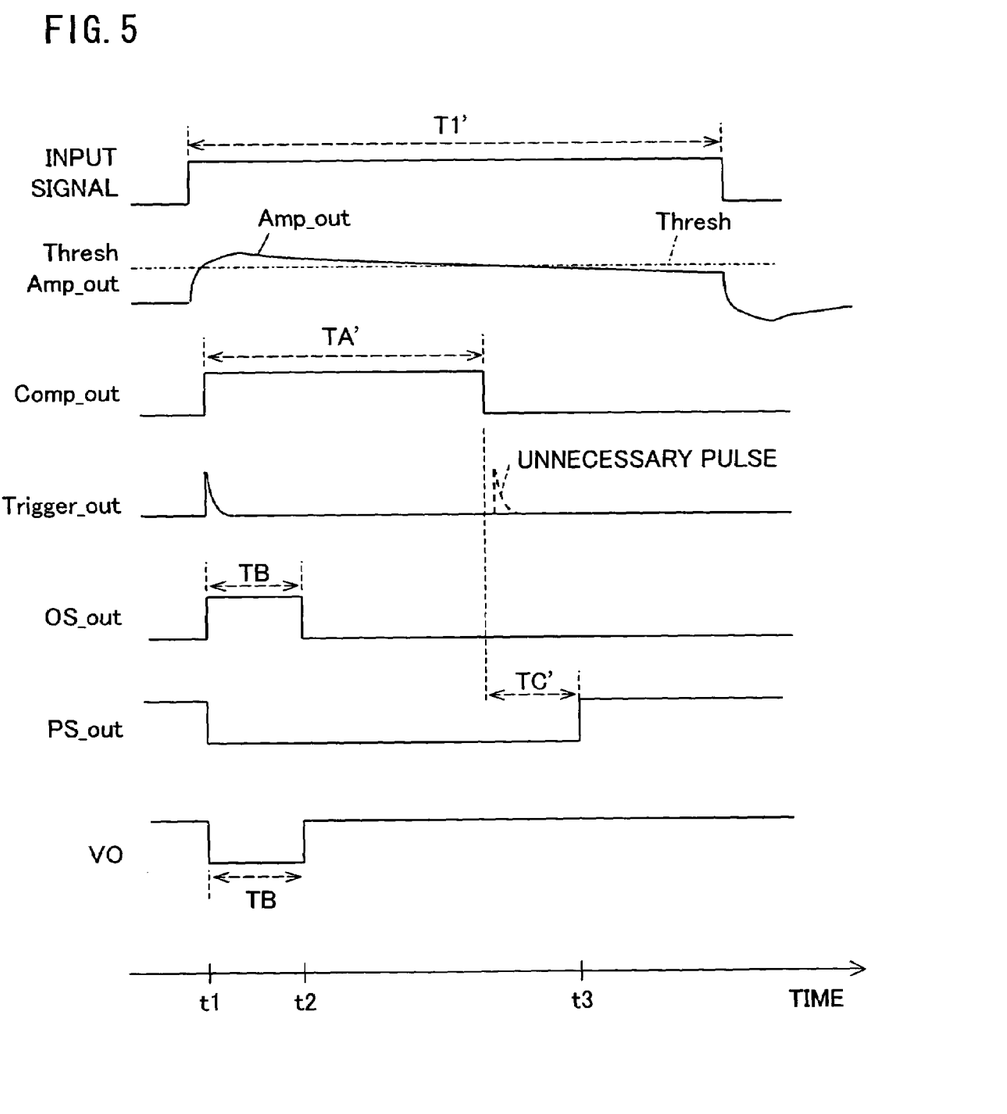
FIG. 5 is a waveform chart illustrating signals generated in the receiving circuit of FIG. 2 in the case where an input signal having a long pulse width is received.

FIG. 5 is a waveform chart illustrating signals generated in the case where an input signal having such a long pulse width (T1') is received.

In this case, the pulse width of the comparator signal (Comp_out), which is the output from the comparator circuit 14, has a high value (TA') that slightly exceeds a half of the pulse width of the input signal.

On the other hand, the pulse width of the one shot pulse signal (OS_out) always has the same value (TB), regardless of the pulse widths of the input signal and of the comparator signal.

Therefore, if the pulse width of the input signal is long, there are cases where the pulse width (TA') of the comparator signal is longer than the pulse width (TB) of the one shot pulse signal, as shown in FIG. 5.

In this case, the value of the amplified signal (Amp_out) becomes lower than the threshold value (Thresh) when certain time elapses after the one shot pulse signal becomes low. When the value of the amplified signal becomes lower than the threshold value (Thresh), the comparator signal becomes low.

At the time immediately after the value of the amplified signal becomes lower than the threshold value, the value of the amplified signal and the threshold value are very close (that is, the malfunction margin (noise margin against malfunctions) of the amplified signal is the smallest).

Therefore, if noises (e.g. noises in the amplifier 12) appear on the amplified signal, there is a possibility that the value of the amplified signal might exceed the threshold value again at this time. In this case, the comparator signal becomes high again, and an unnecessary trigger signal (indicated by the dotted line) is generated. As a result, an unnecessary pulse is outputted from the one shot timer 23.

Figure 6:
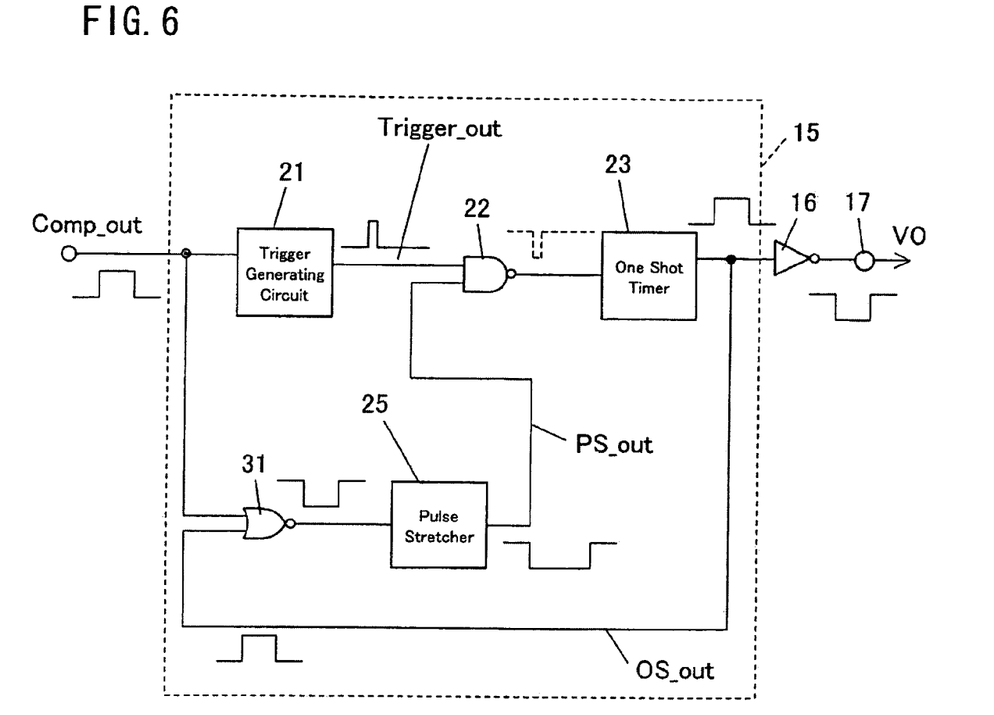
FIG. 6 is a block diagram illustrating an equivalent circuit about an arrangement of another one shot pulse generating circuit of the receiving circuit of FIG. 2.

In order to prevent the unnecessary pulse, the one shot pulse generating circuit 15 may be arranged as shown in FIG. 6.

The one shot pulse generating circuit 15 of FIG. 6 is different from the circuit of FIG. 1 in that the inverter 24 is replaced by a NOR circuit (pulse generating section, stretch section, and logic circuit) 31.

As shown in FIG. 6, the NOR circuit 31 ORs the one shot pulse signal (OS_out) and the comparator signal (Comp_out). If either one of the one shot pulse signal (OS_out) and the comparator signal (Comp_out) is high, the NOR circuit 31 outputs a low signal to the pulse stretcher 25. If both the one shot pulse signal (OS_out) and the comparator signal (Comp_out) are low, the NOR circuit 31 outputs a high signal to the pulse stretcher 25.

Therefore, according to this arrangement, the NOR circuit 31 outputs a low pulse (ON signal) having a longer one of the pulse width of the one shot pulse signal and the pulse width of the comparator signal to the pulse stretcher 25.

Therefore, as shown in FIG. 5, the pulse stretcher 25 outputs to the NAND circuit 22 such a pulse stretch signal (PS_out) that has a pulse width obtained by adding a predetermined stretch time (second time) TC' to the pulse width of the low signal supplied from the NOR circuit 31.

Therefore, according to this arrangement, as shown in FIG. 5, the pulse stretcher 25 keeps outputting a low pulse stretch signal (PS_out) to the NAND circuit 22 from when the comparator signal becomes low until when the stretch time TC' has elapsed (i.e. until time t3).

Therefore, until time t3, the NAND circuit 22 does not transmit the trigger signal (Trigger_out) to the one shot timer 23.

Thus, according to this arrangement, the trigger signal will not be transmitted (the trigger signal will not be accepted) from when the comparator signal becomes low (that is, from when the amplified signal (Amp_out) becomes lower than the threshold value) until when the stretch time TC' has elapsed (i.e. until time t3), even if the amplified signal (Amp_out) exceeds the threshold value again due to the noises.

As a result, it is possible to prevent unnecessary pulses from being generated from the one shot timer 23 due to the noises.

According to this arrangement, the NOR circuit 31 outputs a low signal to the pulse stretcher 25 if either one of the one shot pulse signal and the comparator signal is high, and outputs a high signal to the pulse stretcher 25 if both the one shot pulse signal and the comparator signal are low.

Therefore, it is possible to prevent unnecessary pulses generated if the pulse width of the input signal is short as shown in FIG. 3, that is, unnecessary pulses caused by the distortion of the amplified signal at the rise of the output signal (VO) (at the end of the output).

The malfunction margin (noise margin against malfunctions) is a difference between (i) a value (true signal value) obtained by subtracting the noises from the value of the amplified signal (Amp_out) inputted to the comparator circuit 14 and (ii) the threshold value (Thresh).

The pulse stretch time TC and TC' used by the pulse stretcher 25 may be any value according to the user's preference, as long as the value is such as to prevent unnecessary pulses from being generated from the one shot timer 23.

For example, the stretch time TC' and the stretch time TC may be identical, or may be different from each other.

It is preferable if the pulse stretch time TC and TC' are respectively best suited values in accordance with whether the arrangement of FIG. 1 is adopted or the arrangement of FIG. 6 is adopted.

In the arrangement of FIG. 1, the pulse width of the pulse stretch signal (PS_out) is a sum of the pulse width TB of the one shot pulse signal and the predetermined stretch time TC.

In order to prevent unnecessary pulses, it is effective if the pulse stretch time TC is set to be as long as possible. However, if the pulse stretch time TC is too long, an output signal (necessary pulse) in accordance with the input signal having a predetermined communication rate cannot be generated.

Therefore, it is preferable if, as shown in FIG. 3, the pulse stretch time TC is shorter than a time (TD) obtained by subtracting the one shot pulse width TB from the period (T2) of the input signal determined by the highest communication rate.

With this arrangement, it is possible to prevent unnecessary pulses without preventing the generation of a necessary output signal (output pulse).

In the arrangement of FIG. 6, in order to prevent unnecessary pulses in the case where the pulse width of the input signal is long, it is preferable if the pulse stretch time TC' is not shorter than a time from when the amplified signal becomes lower than the threshold value (from when the comparator signal (Comp_out) becomes low) until when the amplified signal becomes sufficiently low so as not to exceed the threshold value due to noises.

The pulse stretch time TC and TC' may be set in accordance with a frequency range (cutoff frequency) of the amplifiers 12 and 13, which are light-receiving amplifiers.

In general, if high-frequency inputs are cut by providing a low pass filter to the amplifiers 12 and 13 (if the cutoff frequency of the amplifiers 12 and 13 is low), noises (e.g. noises in the amplifiers, noises generated by coupling between input and output, power supply noises that comes from outside, and electromagnetic noises) do not have mush influence.

This is because the noises in the amplifiers 12 and 13 are reduced, and because high-frequency noises are not amplified easily even if noises are received from outside.

However, even in this case, low-frequency noises are amplified. Therefore, if the noises generated at the time of voltage transition (at the rise) of the output signal (VO) or the noises generated immediately after the end of the pulse output of the comparator signal (Comp_out) are low-frequency noises, the waveform of the amplified signal is distorted. In this case, a waveform distortion period (period during which the waveform of the amplified signal is distorted by noises) is long.

Therefore, if the cutoff frequency of the amplifiers 12 and 13 is low, it is preferable if the pulse stretch time TC and TC' are long.

If low-frequency inputs are cut by providing a high pass filter to the amplifiers 12 and 13 (if the cutoff frequency of the amplifiers 12 and 13 is high), the amplified signal from the amplifiers 12 and 13 is distorted if the noises are high-frequency noises. In this case, the waveform distortion period is short.

Therefore, in this case, unnecessary pulses can be prevented even if the pulse stretch time TC and TC' are relatively short.

Thus, in the present receiving circuit, it is preferable if the pulse stretch time TC and TC' are set in accordance with the cutoff frequency of the amplifiers 12 and 13. Specifically, it is preferable if the pulse stretch time TC and TC' are short if the cutoff frequency is high, and to be long if the cutoff frequency is low.

If the cutoff frequency fc of the amplifiers are set by providing a first order low pass filter, a time constant $\tau$ is represented by $$\tau = 1/(2\pi fc).$$

In general, a pulse response time of the amplifiers 12 and 13 is approximately five times longer than $\tau$. The pulse response time of the amplifiers 12 and 13 means the time required when a rectangular (pulse-shaped) input signal is inputted to the amplifier 12 and 13 until a pulse height value of the waveform (rounded waveform) of the amplified signal (Amp_out) outputted from the amplifiers 12 and 13 becomes substantially equal to a pulse height value of the input signal.

If the amplified signal (Amp_out) is outputted through a first-order low pass filter, the pulse height value of the amplified signal pulse is not lower than 99% of the pulse height value of the input signal pulse when time of approximately five times longer than $\tau$ has elapsed.

Therefore, it is assumed that the time required when a noise pulse is inputted to the amplifiers 12 and 13 until the amplifiers 12 and 13 are influenced by the noises is also approximately five times longer than $\tau$.

Accordingly, it is assumed that the time during which the waveform of the amplified signal is distorted by the noises (the time during which there is a possibility that unnecessary pulses might be generated) starts when the noise pulse is inputted to the amplifiers 12 and 13 (immediately after the pulse of the output signal (VO) or of the comparator signal is outputted), and ends when the time of approximately five times longer than τ has elapsed.

Therefore, if the pulse stretch time TC and TC' are close to $2\pi\tau(=1/fc, >5\times\tau)$, which is an inverse number of the cutoff frequency, it is possible to ensure that the one shot timer 23 is protected from the influence of the noises.

Thus, it is preferable if the pulse stretch time TC and TC' are around the time of the inverse number of the cutoff frequency of the amplifiers 12 and 13.

The value around the time of the inverse number is a value between 0.5 times longer than the time of the inverse number and 1.5 times longer than the time of the inverse number.

In IrDA, which is a generally used infrared radiation communication standard as described above, the relationship between the period of the input signal (input pulse period), which is determined by the communication rate, and the pulse width of the input signal (input pulse width) is as shown in FIG. 4.

For example, if the communication rate is 115.2 kbps, the period is 8.68 usec, and the pulse width is 1.63 usec, the necessary frequency range (basic spectrum of the pulse width), which is the cutoff frequency of the amplifiers 12 and 13, is 307 kHz. The inverse number of this frequency range is 3.26 usec. Therefore, in this case, it is preferable if the pulse stretch time TC and TC' are within a range of 1.63 usec to 4.89 usec.

Described so far is the case where the first-order low pass filter is used. However, in the case where a high pass filter or a filter of a higher order is used, the pulse response time is also approximately five times longer than τ, and the relationship of $2\pi\tau=1/fc$ and $2\pi\tau>5\times\tau$ substantially holds true.

Therefore, also in this case, it is possible to avoid the influence of the noises in the same manner if the pulse stretch time TC and TC' are around the time of the inverse number of the cutoff frequency.

In the present embodiment, a low pulse of the output signal (VO) is outputted in accordance with the input signal, and unnecessary pulses are generated at the timing of the rise of this pulse.

However, the present receiving circuit may output an output signal having a high pulse, in accordance with the input signal (for example, the inverter 16 may not be provided).

In this case, there is a possibility that unnecessary pulses might be generated at the timing of the fall of the output signal pulse.

However, also in this case, the pulse stretch signal (PS_out) is low while the output signal pulse is outputted, and after the output signal pulse is outputted until the stretch time TC elapses. Therefore, it is possible to prevent the pulse output of the NAND signal from the NAND circuit 22. As a result, it is possible to prevent unnecessary pulses from occurring in the one shot pulse signal (OS_out).

According to the arrangement of FIG. 6, transmission of the trigger signal to the one shot timer 23 is prevented for the duration of time obtained by adding the pulse stretch time TC' to the longer one of the pulse width of the one shot pulse signal and the pulse width of the comparator signal.

However, depending on the communication form, there are cases where the pulse width of the comparator signal is always longer than the pulse width of the one shot pulse signal.

In this case, the present receiving circuit may be prevent the transmission of the trigger signal to the one shot timer 23 for the duration of time obtained by adding the pulse stretch time TC' to the pulse width of the comparator signal.

For example, the present receiving circuit of such an arrangement can be realized based on the arrangement of FIG. 6, by replacing the NOR circuit 31 with the inverter 24 of FIG. 1, and inputting only the comparator signal from the comparator circuit 14 to the inverter 24 (the one shot pulse signal from the one shot timer 23 is not outputted to the inverter 24, nor to the pulse stretcher 25). With this arrangement, it is possible to simplify the arrangement of the present receiving circuit, thereby reducing manufacturing cost.

In the present embodiment, the photoelectric conversion element of the present receiving circuit is the photodiode (PD 11). However, the photoelectric conversion element of the present receiving circuit may be a phototransistor, instead of the photodiode.

The receiving circuit of the present invention can be expressed as an infrared radiation receiving circuit that generates an output pulse by receiving an input pulse of infrared radiation, converting the input pulse into an electric signal, and amplifying the electric signal, including: a pulse generating section that generates the output pulse by turning an amplified signal amplified through an amplifier into a pulse by using a threshold value, and outputs the output pulse to an external entity; and a suspending section for suspending the pulse generating section from generating the output pulse while the output pulse is outputted, and after the output pulse is outputted until a predetermined first time elapses.

Furthermore, the receiving circuit of the present invention can be expressed as an infrared radiation receiving circuit that generates an output pulse by receiving an input pulse of infrared radiation, converting the input pulse into an electric signal, and amplifying the electric signal, including: a pulse generating section that (i) generates a comparator pulse whose pulse width corresponds to a time during which an absolute value of the amplified signal exceeds the threshold value, (ii) generates the output pulse from the comparator pulse, and (iii) outputs the output pulse to an external entity; and a suspending section for suspending the pulse generating section from generating the output pulse while the comparator pulse is outputted, and after the comparator pulse is outputted until a predetermined second time elapses.

The present invention is applicable to a receiving circuit of an infrared radiation communication system, used in electronic devices such as portable phones, personal computers, and other home electric appliances and industrial devices.

As described above, a first infrared radiation receiving circuit of the present invention (first receiving circuit) is an infrared radiation receiving circuit that generate an output pulse by receiving an input pulse of infrared radiation, converting the input pulse into an electric signal, and amplifying the electric signal, including: a pulse generating section that generates the output pulse by turning an amplified signal amplified through an amplifier into a pulse by using a threshold value, and outputs the output pulse to an external entity; and a suspending section for suspending the pulse generating section from generating the output pulse after the output pulse is outputted until a predetermined first time elapses.

The first receiving circuit is a receiving circuit of an infrared radiation communication system, and used in electronic devices such as portable phones, personal computers, and other home electric appliances and industrial devices.

The first receiving circuit receives an infrared radiation signal (input pulse) inputted from an external transmitting device (transmitting circuit). After that, the first receiving circuit converts the infrared radiation signal into an electric signal by using a photoelectric conversion element, such as a photodiode (PD), and amplifies the electric signal through an amplifier.

As described above, in the first receiving circuit, the pulse generating section generates the output pulse by turning the amplified signal into a pulse by using the threshold value, and outputs the output pulse to an external entity.

The pulse generating section compares the value of the amplified signal (voltage value) and the threshold value, and, at the timing at which the absolute value of the amplified signal exceeds the threshold value, generates an output signal having a predetermined pulse width.

Particularly of note is that the first receiving circuit includes the suspending section that suspends the pulse generating section from generating the output pulse from immediately after the output pulse is outputted to an external entity until the predetermined first time elapses.

With this arrangement, immediately after an output pulse is outputted (at the end of an output), even if noises appear on the amplified signal due to the voltage fluctuation of the output pulse, and the value of the amplified signal exceeds the threshold value, the first receiving circuit does not generate a new output pulse.

Thus, the first receiving circuit ensures that an unnecessary output signal will not be generated due to the noises.

If an infrared radiation receiving circuit is small, there are cases where the noises generated by the voltage fluctuation of the output pulse influence the amplified signal. However, the first receiving circuit can prevent the influence of the noises from spilling over to the output pulse. Thus, the first receiving circuit can be miniaturized easily while maintaining the quality of the output pulse.

It is preferable if the first receiving circuit includes the comparator circuit, the trigger generating circuit, and the one shot timer described below.

The comparator circuit generates a comparator pulse whose pulse width corresponds to a time during which the absolute value of the amplified signal from the amplifier exceeds the threshold value.

The trigger generating circuit generates a trigger pulse in response to occurrence of the comparator pulse.

The one shot timer outputs a one shot pulse having a predetermined pulse width, in response to occurrence of the trigger pulse.

According to this arrangement, an output pulse having a predetermined pulse width can be outputted by using the one shot pulse as an output pulse.

In this arrangement, it is preferable if the suspending section includes a relay circuit and a stretch section described below.

The relay circuit relays the trigger pulse generated by the trigger generating circuit to the one shot timer.

The stretch section generates a stretch pulse that is longer than the one shot pulse by the length of the first time and outputs the stretch pulse to the relay circuit, in response to occurrence of the one shot pulse.

The relay circuit suspends relaying the trigger pulse to the one shot timer while the stretch pulse is generated.

With this arrangement of the suspending section, the first receiving circuit can be realized easily.

In the first receiving circuit, it is effective if the first time is long, in order to prevent unnecessary pulses. However, if the first time is too long, an output pulse (necessary output pulse) in accordance with the input signal having a predetermined communication rate cannot be generated.

Therefore, it is preferable if the first time is shorter than a time obtained by subtracting the pulse width of the one shot pulse from the period of the input signal determined by the highest communication rate. With this arrangement, it is possible to prevent unnecessary pulses without preventing the generation of the output pulse that is in accordance with the input pulse.

In the first receiving circuit, it is preferable that, if the pulse width of the comparator pulse is longer than the pulse width of the one shot pulse, the stretch section, in response to occurrence of the comparator pulse, generates a stretch pulse that is longer than the comparator pulse by a length of a predetermined second time and outputs the stretch pulse to the relay circuit.

If a portion of the amplified signal that exceeds the threshold value is long, there are cases where the output of the one shot pulse is finished while the amplified signal is not lower than the threshold value. In such cases, the value of the amplified signal becomes lower than the threshold value when certain time has elapsed after the output of the one shot pulse is finished (when the value of the amplified signal becomes lower than the threshold value, the output of the comparator pulse is also finished).

At the time immediately after the value of the amplified signal becomes lower than the threshold value, the value of the amplified signal and the threshold value are very close (that is, the malfunction margin (noise margin against malfunctions) of the amplified signal is the smallest).

Therefore, if noises (e.g. noises in the amplifier) appear on the amplified signal at this time, there is a possibility that the value of the amplified signal might exceed the threshold value again. In this case, there is a possibility that a new comparator pulse might be generated. If the new comparator pulse is generated, an unnecessary trigger pulse is generated, resulting in an output of unnecessary pulses from the one shot timer.

However, according to the foregoing arrangement of the first receiving circuit, the output of the trigger pulse to the one shot timer can be stopped after the comparator signal is outputted (after the output is completed) until the second time elapses, even if the amplified signal exceeds the threshold value again due to the noises.

As a result, it is possible to prevent unnecessary pulses from being generated from the one shot timer due to the noises.

The second time may be different from the first time, or may be identical to the first time.

The malfunction margin (noise margin against malfunctions) is a difference between (i) a value (true signal value) obtained by subtracting the noises from the value of the amplified signal (Amp_out) outputted from the amplifier and (ii) the threshold value (Thresh).

This arrangement can be realized by providing the following logic circuit and pulse stretcher to the stretch circuit.

The logic circuit receives the comparator pulse and the one shot pulse, and generates an ON signal when either one of the comparator pulse and the one shot pulse is generated.

The one shot timer generates a stretch pulse whose pulse width corresponds to a time obtained by adding the second time to the time during which the ON signal is generated from the logic circuit, and the one shot timer outputs the stretch pulse to the relay circuit. In this case, the first time and the second time are identical.

In the first receiving circuit, at least one of the first time and the second time may have a value around a time of an inverse number of a cutoff frequency of the amplifier.

The value around the time of the inverse number of the cutoff frequency is a value between 0.5 times longer than the time of the inverse number of the cutoff frequency and 1.5 times longer than the time of the inverse number of the cutoff frequency.

In general, the time during which the waveform of the amplified signal is distorted by noises (time during which there is a possibility that unnecessary pulses might be generated) starts when the noises are inputted to the amplifier (immediately after the output of the output pulse or the comparator pulse is completed) and ends when the period of the foregoing range has elapsed (for details, see the embodiment described above).

Thus, if the first time and the second time are within the foregoing time range, it is possible to ensure that the one shot timer is protected from the influence of noises.

A second infrared radiation receiving circuit (second receiving circuit) of the present invention is an infrared radiation receiving circuit that generate an output pulse by receiving an input pulse of infrared radiation, converting the input pulse into an electric signal, and amplifying the electric signal, including: a pulse generating section that (i) generates a comparator pulse whose pulse width corresponds to a time during which an absolute value of the amplified signal exceeds the threshold value, (ii) generates the output pulse from the comparator pulse, and (iii) outputs the output pulse to an external entity; and a suspending section for suspending the pulse generating section from generating the output pulse after the comparator pulse is outputted until a predetermined second time elapses.

Like the first receiving circuit, the second receiving circuit is a receiving circuit of an infrared radiation communication system, and used in electronic devices such as portable phones, personal computers, and other home electric appliances and industrial devices.

The second receiving circuit receives an input pulse of infrared radiation inputted from an external transmitting device. After that, the second receiving circuit converts the signal into an electric signal by using a photoelectric conversion element, such as a photodiode (PD), and amplifies the electric signal through an amplifier.

As described above, in the second receiving circuit, the pulse generating section generates the comparator pulse whose pulse width corresponds to the time during which the amplified signal from the amplifier exceeds the threshold value. Then, in accordance with the comparator pulse, the pulse generating section generates the output pulse, and outputs the output pulse to an external entity.

Particularly of note is that the second receiving circuit includes the suspending section that suspends the pulse generating section from generating the output pulse from the comparator pulse is outputted until the predetermined second time elapses.

At the time immediately after the comparator pulse is outputted, in other words, at the time immediately after the value of the amplified signal becomes lower than the threshold value, the value of the amplified signal and the threshold value are very close (that is, the malfunction margin of the amplified signal is the smallest).

Meanwhile, the second receiving circuit stops generating the output pulse from immediately after the comparator pulse is outputted until the second time elapses.

With this arrangement of the second receiving circuit, even if noises (e.g. noises in the amplifier) appear on the amplified signal in this period and the amplified signal exceeds the threshold value again, it is possible to prevent the output pulse from being generated due to the noises.

If an infrared radiation receiving circuit is miniaturized, a lens for focusing the input pulse of infrared radiation is also miniaturized. This decreases the amplitude of the input signal. In this case, it is necessary to increase the gain of the amplifier.

If the gain of the amplifier is increased, the noises in the amplifier are increased. Therefore, in the case where the malfunction margin is small, it is worried that the noises might cause unnecessary pulses.

However, the second receiving circuit can prevent unnecessary pulses from occurring due to the noises immediately after the comparator pulse is outputted, that is, while the malfunction margin is small. Therefore, the second receiving circuit can be miniaturized easily while maintaining the quality of the output pulse.

It is preferable if, as in the first receiving circuit, the pulse generating section of the second receiving circuit includes the comparator circuit, the trigger generating circuit, and the one shot timer.

The comparator circuit generates a comparator pulse whose pulse width corresponds to a time during which the absolute value of the amplified signal from the amplifier exceeds the threshold value.

The trigger generating circuit generates a trigger pulse in response to occurrence of the comparator pulse.

The one shot timer generates a one shot pulse having a predetermined pulse width, in response to occurrence of the trigger pulse.

According to this arrangement, the use of the one shot pulse as an output pulse makes it possible to output an output pulse having a predetermined pulse width.

In this arrangement, it is preferable if the suspending section includes a relay circuit and a stretch section.

The relay circuit relays the trigger pulse generated by the trigger generating circuit to the one shot timer.

The stretch section generates a stretch pulse that is longer than the one shot pulse by the length of the first time and outputs the stretch pulse to the relay circuit, in response to occurrence of the one shot pulse.

The relay circuit suspends relaying the trigger pulse to the one shot timer while the stretch pulse is generated. With this arrangement of the suspending section, the second receiving circuit can be realized easily.

The relay circuit of the first or second receiving circuit may be a logic circuit that receives the trigger pulse and the stretch pulse, and relays the trigger pulse to the one shot timer only when the stretch pulse is not generated. With this arrangement, the relay circuit of the first and second receiving circuit can be realized easily.

In the second receiving circuit, as in the first receiving circuit, the second time may have a value around the time of the inverse number of the cutoff frequency of the amplifier.

A first infrared radiation receiving method of the present invention (first method) is an infrared radiation receiving method for generating an output pulse by receiving an input pulse of infrared radiation, converting the input pulse into an electric signal, and amplifying the electric signal, including: an output pulse generating step, in which the output pulse is generated by turning an amplified signal amplified through an amplifier into a pulse by using a threshold value, and the output pulse is outputted to an external entity; and a suspending step, in which generation of the output pulse is suspended after the output pulse is outputted until a predetermined first time elapses.

A second infrared radiation receiving method of the present invention (second method) is an infrared radiation receiving method for generating an output pulse by receiving an input pulse of infrared radiation, converting the input pulse into an electric signal, and amplifying the electric signal, including: a pulse generating step, in which (i) a comparator pulse whose pulse width corresponds to a time during which an absolute value of the amplified signal exceeds the threshold value is generated, (ii) the output pulse is generated from the comparator pulse, and (iii) the output pulse is outputted to an external entity; and a suspending step, in which generation of the output pulse is suspended after the comparator pulse is outputted until a predetermined second time elapses.

The first method is used in the first receiving circuit, and the second method is used in the second receiving circuit.

According to these methods, the receiving circuit can be miniaturized easily, while maintaining the quality of the output pulse.

Transmission and reception modules used in infrared radiation communication are getting smaller, higher in performance, and speedier. As a result, the infrared radiation communication is taking root in the market. Since the transmission and reception modules are used in various environments, the possibilities of malfunctions and the like problems of the transmission and reception modules are increasing. With regard to malfunctions, properties of the receiving circuit and the margin for malfunctions in various operating environments (e.g. in the presence of external scattered light or power supply noises) are important. It is important to ensure the noise margin and the function of preventing malfunctions in the operating environments of the receiving circuit. The present invention is about how to prevent the malfunctions. The present receiving circuit of FIG. 2 feeds buck the output of the one shot pulse generating circuit to the comparator output, and thereby controls the one shot pulse generating circuit so as to prevent malfunctions, at the timing at which a receiver output pulse (output signal) makes a transition from high to low or from low to high. The receiver output pulse might be capacitance-coupled to a receiver input section at the timing at which the receiver output pulse makes a transition from high to low or from low to high. This causes a problem of distortion of the waveform of the amplified signal or a problem of superimposition of noises on the waveform of the amplified signal. However, even if these problems occur, thereby causing unnecessary pulses in the comparator output, the present receiving circuit controls the one shot pulse generating circuit so that the unnecessary pulses will not be accepted.

FIG. 3 is a diagram illustrating an example of specific waveforms for preventing malfunctions. The operation of the present receiving circuit can also be described as follows. There is a digital signal output (time TA) detected in the comparator output Comp_out. Based on this pulse, a trigger pulse is generated. Based on the trigger pulse, a one shot output pulse (time TB) is generated. Then, a PS_out is generated by stretching the waveform of the one shot pulse output for a predetermined time (time TC). During the period of the pulse of OS_out, no trigger input for generating the one shot pulse is received. According to this arrangement, the one shot pulse will not be generated again even if (i) the noises immediately after the end of the receiver output pulse (time TB) distort the waveform of the amplified signal, (ii) the distortion generates unnecessary pulses in the comparator output Comp_out, and (iii) the unnecessary pulses cause an unnecessary trigger pulse. As a result, malfunctions are prevented, and therefore the noise margin is ensured. In order to prevent unnecessary pulses, it is effective if the stretched width (time TC) of the pulse PS_out obtained by stretching the one shot pulse OS_out is as long as possible. However, if the stretched width is too long, signals cannot be received at a predetermined communication rate. In view of the circumstance, an optimal length of pulse stretch can be attained within a predetermined communication rate if the length of pulse stretch is shorter than a time (time TD) obtained by subtracting the one shot pulse width (time TB) from the minimum period (T2), which is determined by the highest communication rate.

FIG. 5 can also be explained as follows. The pulse PS_out is generated by stretching the waveform of the pulse of time TA' by the time TC'. With this arrangement, the trigger input of the one shot pulse generating circuit will not be accepted during the signal detection period and during a predetermined time after the signal detection period. As a result, malfunctions are decreased, and the malfunction margin is ensured. Furthermore, if, by combining this idea with the concept of FIG. 3, the one shot pulse generating output OS_out and the comparator output Comp_out are ORed, it is possible to ensure that the trigger input will not be accepted again so that the receiver output pulse will not be generated again within a period of a detected signal, within the receiving output width generation period, or within a predetermined time immediately after the end of the receiver output pulse.

The arrangement of FIG. 1 can also be expressed as an infrared radiation communication receiving circuit including a circuit that generates a receiver output pulse during a time of a predetermined pulse width in response to a trigger, which is detected as a digital signal by amplifying, through a light-receiving amplifier, a signal light pulse that is made incident on a light-receiving element, and comparing an output of the light-receiving amplifier with the threshold value, the infrared radiation communication receiving circuit including: a trigger generating circuit, a one shot timer, and a pulse stretch circuit, an input of the trigger generating circuit is coupled to a comparator output, an output of the one shot timer circuit being coupled to an input of the pulse stretch circuit, an AND of (i) an output of the trigger generating circuit and (ii) an output of the pulse stretch circuit being coupled to an input of the one shot timer circuit (the AND is obtained from a NAND circuit). Operating waveforms of the members of this circuit correspond to the waveforms of Comp_out, Trigger_out, OS_out, PS_out, and VO, respectively. The detected digital pulse of the Comp_out is used to generate the trigger, and the trigger is inputted to the one shot timer. At this time, the output of the one shot timer is fed back and ANDed with the output of the pulse stretcher circuit, and the resultant signal is inputted to the one shot timer. With this arrangement, the one shot timer will not receive the trigger pulse within the time of the one shot generating pulse (time TB) or within the stretched time (time TC). As a result, malfunctions are prevented at once.

The arrangement of FIG. 6 is based on the arrangement of FIG. 1, and the comparator output and the output of the one shot timer circuit are ORed, and the resultant signal is coupled to the input of the pulse stretch circuit. Operating waveforms of the members of this circuit correspond to the waveforms of Comp_out, Trigger_out, OS_out, PS_out, and VO, respectively. The detected digital pulse of the Comp_out is used to generate the trigger, and the trigger is inputted to the one shot timer. At this time, the output of the one shot timer and the comparator output are ORed, and the resultant signal is pulse-stretched. Then, the pulse-stretched signal is ANDed with the trigger, and the resultant signal is inputted to the one shot timer. With this arrangement, the one shot timer will not receive the trigger pulse within the signal detection time (time TA'), within the time of the one shot generating pulse (time TB'), or within the stretched time (time TC'). As a result, malfunctions are prevented at once.

The noise margin against malfunctions can also be expressed as a quantity of margin with respect to the signal detection level (Thresh), for preventing mistaken detection due to noises and the like. Conventionally, since infrared radiation modules are getting smaller, the distance between the receiver input and the receiver output is physically short. Therefore, the input and output are easily coupled to each other. As a result, the influence of the coupling between the receiver input and the receiver output can no longer be ignored, and the influence causes amplifier waveform distortion, thereby decreasing the malfunction margin. Moreover, since the miniaturization of infrared radiation modules means that the lens for focusing the height of a received signal is also small, the input signal is decreased (sufficient receiver input signal cannot be obtained). To compensate for the decrease, it is necessary to increase the gain of the amplifier. As a result, inner noises are increased, and the problem of coupling of input and output becomes worse.

It is preferable if the pulse stretch times TC and TC' are set in accordance with the frequency range of the light-receiving amplifier. If the cutoff frequency of the light-receiving amplifier is low, noises are unlikely to have much influence, but there is a long period of waveform distortion that occurs when the noises generated by the voltage transition of the receiver output pulse appear. Therefore, to prevent malfunctions, it is preferable to set a long pulse stretch time, in accordance with the long period of waveform distortion. On the other hand, if the cutoff frequency of the light-receiving amplifier is high, there is only a short period of the waveform distortion that occurs when the noises generated by the voltage transition of the receiver output pulse appear on the light-receiving amplifier. In this case, malfunctions can be prevented with a relatively short stretch time. In IrDA, which is a generally used infrared radiation communication standard, the relationship between the input pulse period, which is determined by the communication rate, and the input pulse width is as shown in FIG. 4. Therefore, by setting the pulse stretch time in accordance with the frequency range (i.e. cutoff frequency) of the light-receiving amplifier, malfunctions can be prevented appropriately.

The present invention can also be expressed as the following first to tenth infrared radiation receiving circuits and the first electronic device. The first infrared radiation receiving circuit includes a circuit for outputting a receiver output pulse as a digital signal by receiving a signal light pulse at a light-receiving element, amplifying the signal light pulse through a light-receiving amplifier, and comparing an output of the light-receiving amplifier with a threshold value, the receiving circuit being unresponsive during a predetermined time after receiver output pulse makes a transition from high to low or low to high. With this arrangement, it is possible to decrease the influence of the transition of the receiver output pulse from high to low or low to high, and the influence of the coupling between input and output on the receiving amplifier.

The second infrared radiation receiving circuit is the first infrared radiation receiving circuit, which includes a circuit that generates a receiver output pulse during a time of a first predetermined time in response to a trigger, which is a digital signal obtained by amplifying, through the light-receiving amplifier, a signal light pulse that is made incident on a light-receiving element, and comparing an output of the light-receiving amplifier with the threshold value, wherein re-triggering is prohibited so that there is no recurrence of the receiver output pulse during a determined second time immediately after an end of the receiver output pulse. With this arrangement, it is possible to prevent the malfunctions during the predetermined time, even if the waveform distortion of the receiving amplifier is caused due to noises generated immediately after the end of the receiver output pulse.

The third infrared radiation receiving circuit is the first or second infrared radiation receiving circuit, which includes a circuit that generates a receiver output pulse during a time of a predetermined pulse width in response to a trigger, which is a digital signal obtained by amplifying, through the light-receiving amplifier, a signal light pulse that is made incident on a light-receiving element, and comparing an output of the light-receiving amplifier with the threshold value, wherein re-triggering is prohibited during a period in which the pulse is generated. With this arrangement, it is possible to prevent the one shot pulse generating circuit from being re-triggered, and thereby prevent expansion of the pulse width.

The fourth infrared radiation receiving circuit is the infrared radiation receiving circuit, which includes a circuit that generates a receiver output pulse during a time of a predetermined pulse width in response to a trigger, which is detected as a digital signal by amplifying, through a light-receiving amplifier, a signal light pulse that is made incident on a light-receiving element, and comparing an output of the light-receiving amplifier with the threshold value, wherein re-triggering is prohibited during a period of the detected signal. With this arrangement, if (i) a pulse whose width is longer than a pulse width of the pulse generated by the one shot pulse generating circuit is inputted, and (ii) the detection time is also longer than the one shot pulse width, malfunctions during the detection time can be prevented.

The fifth infrared radiation communication receiving circuit is one of the first to fourth infrared radiation communication receiving circuits, which includes a circuit that generates a receiver output pulse during a time of a first predetermined pulse width in response to a trigger, which is detected as a digital signal by amplifying, through a light-receiving amplifier, a signal light pulse that is made incident on a light-receiving element, and comparing an output of the light-receiving amplifier with the threshold value, wherein re-triggering is prohibited so that there is no recurrence of the receiver output pulse during a period of the detected signal, during the receiver output width generation period, or during a second predetermined time immediately after an end of the receiver output pulse. With this arrangement, a malfunction prevention period can be optimized both in the case where the pulse width of the receiver input pulse is shorter than the pulse width of the pulse generated by the one shot pulse generating circuit and in the case where the pulse width of the receiver input pulse is longer than the pulse width of the pulse generated by the one shot pulse generating circuit.

The sixth infrared radiation receiving circuit is one of the first to third and fifth infrared radiation receiving circuits, which includes a circuit that generates a receiver output pulse during a time of a first predetermined pulse width in response to a trigger, which is a digital signal obtained by amplifying, through a light-receiving amplifier, a signal light pulse that is made incident on a light-receiving element, and comparing an output of the light-receiving amplifier with the threshold value, wherein re-triggering is prohibited so that there is no recurrence of the receiver output pulse during a second determined time immediately after an end of the receiver output pulse; and the second predetermined time is shorter than a time that corresponds to a difference between (i) a minimum pulse period (T2), which is determined by a maximum communication rate used and (ii) the time of the first predetermined pulse width. With this arrangement, since the malfunction prevention period is determined in accordance with the difference between the period determined by the communication rate and the width of the receiver output pulse that derives from the one shot pulse, it is possible to realize a predetermined communication rate and to optimize the malfunction prevention period.

The seventh infrared radiation receiving circuit is one of the fourth to sixth infrared radiation receiving circuits, which includes a circuit that generates a receiver output pulse during a time of a first predetermined pulse width in accordance with a trigger, which is detected as a digital signal by amplifying, through a light-receiving amplifier, a signal light pulse that is made incident on a light-receiving element, and comparing an output of the light-receiving amplifier with the threshold value, wherein re-triggering is prohibited during a second predetermined time immediately after an end of a period of the detected signal. With this arrangement, although there is a region where malfunctions are very likely to occur depending on input conditions when the amplifier output waveform crosses the threshold value in case the receiver input pulse width is long, it is possible to prevent the malfunctions in this time region.

The eighth infrared radiation receiving circuit is one of the second to seventh infrared radiation receiving circuits, wherein the second predetermined time is around a time of an inverse number of a cutoff frequency of the light-receiving amplifier. With this arrangement, since the period for preventing malfunctions is set in accordance with the frequency range of the light-receiving amplifier, it is possible to set a malfunction prevention period that is best suited for the transient response waveform of the noises that appear on the amplifier. The ninth infrared radiation communication receiving circuit is one of the first to eighth infrared radiation receiving circuits, which includes a circuit that generates a receiver output pulse during a time of a predetermined pulse width in response to a trigger, which is detected as a digital signal by amplifying, through a light-receiving amplifier, a signal light pulse that is made incident on a light-receiving element, and comparing an output of the light-receiving amplifier with the threshold value, the infrared radiation communication receiving circuit including a comparator circuit, a trigger generating circuit, a one shot timer, and a pulse stretch circuit, an input of the trigger generating circuit being coupled to an output of the comparator circuit, an output of the one shot timer circuit being coupled to an input of the pulse stretch circuit, an AND of (i) an output of the trigger generating circuit and (ii) an output of the pulse stretch circuit being coupled to an input of the one shot timer circuit. With this arrangement, it is possible to set the period for preventing the malfunctions easily and to realize the function. Moreover, the period of the width of the receiver output pulse that derives from the one shot pulse and the period after the end of the receiver output pulse can be set at once as a malfunction prevention period.

The tenth infrared radiation receiving circuit is the ninth infrared radiation receiving circuit, wherein an OR of (i) the comparator output and (ii) the one shot timer circuit (output) is coupled to the input of the pulse stretch circuit. With this arrangement, it is possible to set the period for preventing the malfunctions easily and to realize the function. Moreover, re-triggering can be prohibited at once so that there is no recurrence of the receiver output pulse during the period of the detected signal, during the receiver output pulse generation period, or during the predetermined period immediately after the end of the receiver output pulse. The first electronic device includes one of the first to ninth infrared radiation receiving circuits.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An infrared radiation receiving circuit that generates an output pulse by receiving an input pulse of infrared radiation, converting the input pulse into an electric signal, and amplifying the electric signal, comprising:
　a pulse generating section that generates the output pulse by turning an amplified signal amplified through an amplifier into a pulse by using a threshold value, and outputs the output pulse to an external entity; and
　a suspending section for suspending the pulse generating section from generating the output pulse after the output pulse is outputted until a predetermined first time elapses, wherein:
　the pulse generating section includes
　　a comparator circuit that generates a comparator pulse whose pulse width corresponds to a time during which an absolute value of the amplified signal exceeds the threshold value;
　　a trigger generating circuit that generates a trigger pulse in response to occurrence of the comparator pulse; and
　　a one shot timer that outputs a one shot pulse having a predetermined pulse width, in response to occurrence of the trigger pulse.

2. The infrared radiation receiving circuit as set forth in claim 1, wherein:
　the suspending section includes
　　a relay circuit that relays the trigger pulse generated by the trigger generating circuit to the one shot timer; and
　　a stretch section that generates a stretch pulse that is longer than the one shot pulse by a length of the first time and outputs the stretch pulse to the relay circuit, in response to occurrence of the one shot pulse; and
　the relay circuit suspends relaying the trigger pulse to the one shot timer while the stretch pulse is generated.

3. The infrared radiation receiving circuit as set forth in claim 2, wherein:
　the first time is shorter than a time obtained by subtracting the pulse width of the one shot pulse from a period of the input pulse.

4. The infrared radiation receiving circuit as set forth in claim 2, wherein:
　the relay circuit is a logic circuit that receives the trigger pulse and the stretch pulse, and relays the trigger pulse to the one shot timer only when the stretch pulse is not generated.

5. The infrared radiation receiving circuit as set forth in claim 2, wherein:
　if the pulse width of the comparator pulse is longer than the pulse width of the one shot pulse, the stretch section generates a stretch pulse that is longer than the comparator pulse by a length of a predetermined second time and outputs the stretch pulse to the relay circuit, in response to occurrence of the comparator pulse.

6. The infrared radiation receiving circuit as set forth in claim 5, wherein:
　the stretch section includes
　　a logic circuit that receives the comparator pulse and the one shot pulse, and generates an ON signal when either one of the comparator pulse and the one shot pulse is generated; and
　　a pulse stretcher that generates a stretch pulse whose pulse width is obtained by adding the second time to a time during which the ON signal is generated by the logic circuit, and outputs the stretch pulse to the relay circuit.

7. The infrared radiation receiving circuit as set forth in claim 1, wherein:
the first time is around a time of an inverse number of a cutoff frequency of the amplifier.

8. An electronic device, comprising:
the infrared radiation receiving circuit as set forth in claim 1.

9. An infrared radiation receiving circuit that generates an output pulse by receiving an input pulse of infrared radiation, converting the input pulse into an electric signal, and amplifying the electric signal, comprising:
a pulse generating section that (i) generates a comparator pulse whose pulse width corresponds to a time during which an absolute value of the amplified signal exceeds the threshold value, (ii) generates the output pulse from the comparator pulse, and (iii) outputs the output pulse to an external entity; and
a suspending section for suspending the pulse generating section from generating the output pulse after the comparator pulse is outputted until a predetermined second time elapses, wherein:
the pulse generating section includes
a comparator circuit that generates the comparator pulse whose pulse width corresponds to the time during which the absolute value of the amplified signal exceeds the threshold value;
a trigger generating circuit that generates a trigger pulse in response to occurrence of the comparator pulse; and
a one shot timer that outputs a one shot pulse having a predetermined pulse width, in response to occurrence of the trigger pulse.

10. The infrared radiation receiving circuit as set forth in claim 9, wherein:
the suspending section includes
a relay circuit that relays the trigger pulse generated by the trigger generating circuit to the one shot timer; and
a stretch section that generates a stretch pulse that is longer than the comparator pulse by a length of the second time and outputs the stretch pulse to the relay circuit, in response to occurrence of the comparator pulse; and
the relay circuit suspends relaying the trigger pulse to the one shot timer while the stretch pulse is generated.

11. The infrared radiation receiving circuit as set forth in claim 10, wherein:
the relay circuit is a logic circuit that receives the trigger pulse and the stretch pulse, and relays the trigger pulse to the one shot timer only when the stretch pulse is not generated.

12. The infrared radiation receiving circuit as set forth in claim 9, wherein:
the second time is around a time of an inverse number of a cutoff frequency of the amplifier.

13. An electronic device, comprising:
the infrared radiation receiving circuit as set forth in claim 9.

14. An infrared radiation receiving method for generating an output pulse by receiving an input pulse of infrared radiation, converting the input pulse into an electric signal, and amplifying the electric signal, comprising:
an output pulse generating step, in which the output pulse is generated by turning an amplified signal amplified through an amplifier into a pulse by using a threshold value, and the output pulse is outputted to an external entity; and
a suspending step, in which generation of the output pulse is suspended after the output pulse is outputted until a predetermined first time elapses wherein:
the output pulse generating step includes
generating a comparator pulse whose pulse width corresponds to a time during which an absolute value of the amplified signal exceeds the threshold value;
generating a trigger pulse in response to occurrence of the comparator pulse; and
outputting a one shot pulse having a predetermined pulse width, in response to occurrence of the trigger pulse.

15. An infrared radiation receiving method for generating an output pulse by receiving an input pulse of infrared radiation, converting the input pulse into an electric signal, and amplifying the electric signal, comprising:
a pulse generating step, in which (i) a comparator pulse whose pulse width corresponds to a time during which an absolute value of the amplified signal exceeds the threshold value is generated, (ii) the output pulse is generated from the comparator pulse, and (iii) the output pulse is outputted to an external entity and
a suspending step, in which generation of the output pulse is suspended after the comparator pulse is outputted until a predetermined second time elapses, wherein:
the pulse generating step includes
generating the comparator pulse whose pulse width corresponds to the time during which the absolute value of the amplified signal exceeds the threshold value;
generating a trigger pulse in response to occurrence of the comparator pulse; and
outputting a one shot pulse having a predetermined pulse width, in response to occurrence of the trigger pulse.

* * * * *